Dec. 26, 1950  C. A. McINTYRE ET AL  2,535,805
WINDSHIELD WIPER ATTACHMENT
Filed Dec. 26, 1946

INVENTORS
CHARLES A. McINTYRE
WILLIAM E. BARDEN
Edward C. Healy
ATTORNEY

Patented Dec. 26, 1950

2,535,805

UNITED STATES PATENT OFFICE 2,535,805

WINDSHIELD WIPER ATTACHMENT

Charles A. McIntyre and William E. Barden,
San Francisco, Calif.

Application December 26, 1946, Serial No. 718,478

1 Claim. (Cl. 15—250.3)

This invention relates to an improved windshield cleaner and has particular reference to a specially constructed attachment for windshield wipers and to a novel cleaning element held by the said attachment whereby fog, sludge and the like are prevented from obstructing the clear vision of the windshield.

Certain cleaning elements and oils such as glycerin and terpene will prevent fog and sludge from clinging to the surface or otherwise marring the windshield. It is well known that glycerin and terpene are contained in cigarettes.

It is therefore an object of the present invention to provide means on a windshield wiper or the arm thereof for retaining a cigarette thereon in a manner whereby the moisture in the air driven against the cigarette will cause a sufficient quantity of the glycerin and terpene to be absorbed in the air and immediately transferred to the outer surface of the windshield, thus providing for clear vision. This device is most practical and effective in rainy and snowy weather, when the windshield wiper is more frequently used by the operator of the motor vehicle.

Another object of the present invention is to retain the cigarette in an apertured tube and to detachably secure the said tube to the windshield wiper.

A further object of the present invention is to preferably construct the said apertured tube of a substantial resilient material and to longitudinally slot the same, whereby the said tube is slidably supported and detachably retained on the windshield wiper.

A still further object of the present invention is to provide a flexible bottom in the said tube and to slot the said bottom to fit the said windshield wiper.

A still further object of the present invention is to provide a windshield cleaner of the character described that is durable, exceptionally simple in construction, economical to manufacture, and highly efficient and serviceable in use.

Other objects and advantages will be apparent during the course of the following description.

Figure 1:
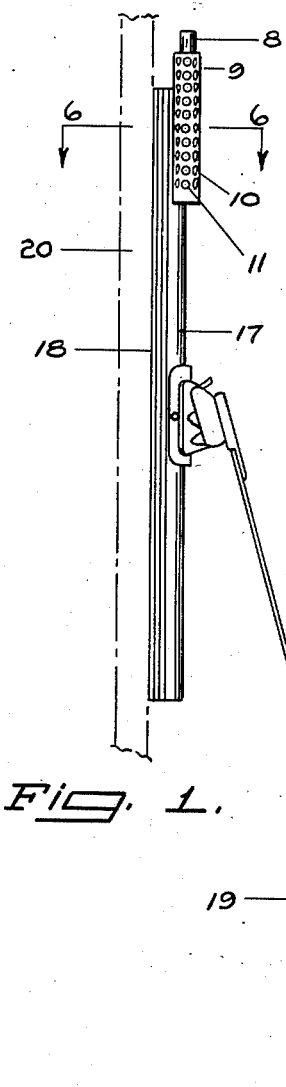
Figure 2:
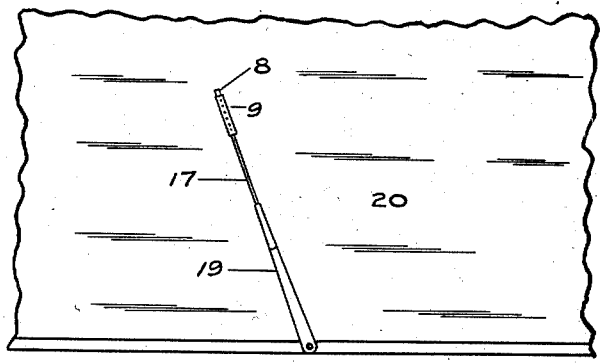
Figures 3, 4:
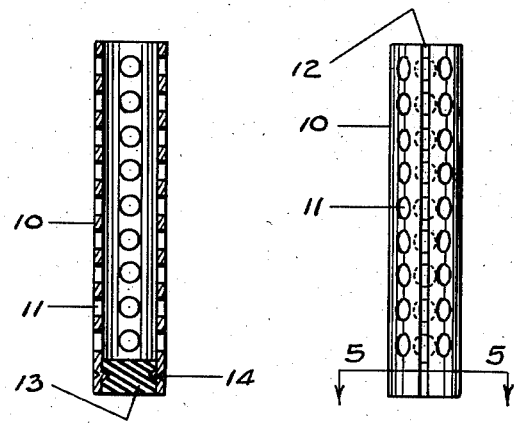
Figure 5:
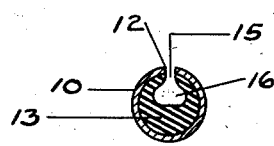
Figure 6:
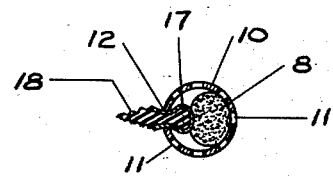

In the accompanying drawing forming a part of the specification, wherein for the purpose of illustration like numerals designate like parts throughout the same, Fig. 1 is a side elevational view of a conventional windshield wiper and the improved device attached thereon, Fig. 2 is a front fragmentary plan view of an automobile windshield and one type of windshield wiper and illustrating the device positioned on the upper portion thereof, Fig. 3 is a central vertical longitudinal sectional view of the tubular device for retaining the cigarette, particularly illustrating the perforations provided through the wall of the tube and the flexible cover in the bottom portion, Fig. 4 is a vertical elevational view of the device, illustrating the longitudinal slot extending the full length of the tube, Fig. 5 is a transverse sectional plan view taken through line 5—5 of Fig. 4, and Fig. 6 is a transverse sectional view taken through line 6—6 of Fig. 1, showing a cigarette positioned in the device and illustrating the preferred method employed for retaining the device on the windshield wiper holder.

Referring in detail to the different parts of the invention the numeral 9 designates as a whole the preferred form of device employed for retaining a cigarette or the like 8 and embodies in its construction a tubular member 10, of any suitable diameter and length, that is perforated as at 11. It will be noted that the perforations extend in and around the wall of the tube and are arranged in series therein as illustrated to advantage in Figs. 3 and 6.

The tube is formed with a slot 12 that extends the full length of the same, as illustrated to advantage in Fig. 4. A flexible end cover 13, made of rubber or any other suitable flexible material, is fixed in the bottom portion of the tube and is preferably held therein by a plurality of indentations 14 as shown in Fig. 3. The said end cover may be fixed in the tube in any other suitable manner and is slotted as at 15 and provided with an opening 16 to conform with the shape of the windshield wiper holder 17. The numeral 18 designates the wiper blade and the numeral 19 the arm of the wiper.

The present invention may be employed on any type of windshield wiper operated in any manner and attached to the upper or lower part of the wiper holder or to the arm or any other portion of the wiper assembly in any suitable position. The tube 10 is preferably made of a suitable spring metal or other resilient material such as plastic, whereby the wiper holder 17 is substantially gripped in the slot 12 as shown in Fig. 6. Any other suitable method may be provided for attaching the device to the wiper. The device can be made of a single sheet of material apertured and formed into the required shape or a conventional tube cut to length, and suitably apertured and slotted, may be employed, if desired.

In Fig. 1 there is illustrated in dot and dash lines an automobile or other vehicle windshield 20. It will be particularly noted that the perforated container is spaced from the windshield and that the cigarette does not contact the latter. However, when the vehicle is moving forward the moisture or rain in the air will absorb a small portion of the cleansing agent in the cigarette and the air pressure directed against the windshield caused by the moving of the vehicle will force the tobacco laden moisture against the windshield where it will be contacted by the wiper. Since the tobacco in the cigarette is only protected by or encased in a thin fragile paper covering, it will be obvious that under the influence of moisture, such as rain, the paper covering will rapidly disintegrate and release the soggy tobacco. The tobacco will then be directed by air pressure to the windshield and into the path of the wiper. The operating efficiency of the wiper is in no way affected but the cleansing efficiency is greatly increased. Any type or form of a tobacco element or cleansing agent capable of being absorbed in the moisture of the air as stated can be employed to serve the purpose of the invention.

It is to be understood that the form of my invention herewith shown and described is to be taken as a preferred example of the same and that various changes relative to the shape, size, material and arrangement of parts may be resorted to without departing from the spirit of the invention or the scope of the subjoined claim.

Having thus described our invention, we claim:

A device of the character described for use on a windshield wiper embodying in its construction a perforated cylindrical container made of a spring material for retaining a cigarette, a flexible bottom therein and a slot extending longitudinally through the wall of the said container and flexible bottom for resiliently clamping the container to the said windshield wiper.

CHARLES A. McINTYRE.
WILLIAM E. BARDEN.

REFERENCES CITED

The following references are of record in the file of this patent:

UNITED STATES PATENTS

| Number | Name | Date |
| --- | --- | --- |
| 1,386,362 | Pittman | Aug. 2, 1921 |
| 1,647,319 | Shults | Nov. 1, 1927 |
| 1,919,236 | Lunsford | July 25, 1933 |
| 2,034,880 | Sackett | Mar. 24, 1936 |